United States Patent [19]

Paul

[11] 4,075,097
[45] Feb. 21, 1978

[54] OIL FILTER WITH OIL IMPROVING DISSOLVING BODY

[75] Inventor: George A. Paul, Midland, Mich.

[73] Assignee: Monroe Auto Equipment Company, Monroe, Mich.

[21] Appl. No.: 564,111

[22] Filed: Apr. 1, 1975

[51] Int. Cl.² .................. B01D 35/00; C10M 7/10
[52] U.S. Cl. .................... 210/168; 210/199; 210/206; 210/209; 210/501; 23/267 B; 252/10
[58] Field of Search .............. 210/117, 130, 131, 136, 210/501, 502, 506, 507, 209, 167, 168; 252/9, 10, 11, 56 R, 59, 199, 206; 23/267 B, 267 D, 272

[56] References Cited

U.S. PATENT DOCUMENTS

| B 449,988 | 3/1976 | Lewis | 210/199 |
|---|---|---|---|
| B 449,989 | 3/1976 | Cohen et al. | 210/168 |
| 2,785,805 | 3/1957 | Hough | 210/501 |
| 3,252,270 | 5/1966 | Pall | 210/502 |
| 3,268,077 | 8/1966 | Ball | 210/136 |
| 3,313,416 | 4/1967 | Rosaen | 210/130 |
| 3,336,223 | 8/1967 | Kneeland | 210/506 |
| 3,397,784 | 8/1968 | Hultgren | 210/136 |
| 3,473,664 | 10/1969 | Hultgren | 210/130 |
| 3,608,724 | 9/1971 | Baldwin | 210/130 |
| 3,715,037 | 2/1973 | Shin-En Hu et al. | 210/506 |
| 3,749,247 | 7/1973 | Rohde | 210/501 |
| 3,887,468 | 6/1975 | Bray | 210/206 |

OTHER PUBLICATIONS

Smalheer, Smith, Lubricant Additives, 1967, The Lezius-Hiles Co., Cleveland, Ohio.

Primary Examiner—Charles N. Hart
Assistant Examiner—Ernest G. Therkorn
Attorney, Agent, or Firm—Harness, Dickey & Pierce

[57] ABSTRACT

An oil filter is disclosed as having a filter enclosure provided with oil inlet and outlet ports adapted for communication with the oil circulating system of an associated oil lubricated engine. Disposed within the enclosure is a filter element fabricated of any suitable filtering media. In addition to the filter element, a body of an oil soluble, relatively solid polymer having oil additives compounded therein is disposed within the enclosure. The polymer body is located within the enclosure so as to be in an area where minimum oil flow occurs, i.e. in a relatively non-turbulent oil flow area, which results in the polymer dissolving at a relatively uniform or linear rate so as to prevent undesirable concentrations of the additives during the effective service life of the filter. If desired, suitable baffle means may be interposed between the area of primary oil flow within the filter and the oil soluble polymer, whereby to provide for the controlled contact of the flow of turbulent oil within the filter with the polymer body and thereby assure the desired linear or uniform rate of polymer dissolution.

16 Claims, 7 Drawing Figures

OIL FILTER WITH OIL IMPROVING DISSOLVING BODY

BACKGROUND OF THE INVENTION

As is well known in the art, modern automotive vehicle engines are produced with circulating oil lubrication systems wherein oil is forced under pressure by means of the engine driven oil pump from the oil sump or pan through various lubricating passages to the critical points of lubrication of the engines. In order to remove or at least minimize oil contaminants within such engine lubrication systems, it has been the practice to incorporate oil filters therein. It is usually the case that such filters are of the replaceable type and as such, the filter units are periodically discarded and replaced, usually concurrently with the replacement of the engine lubricating oils. Generally, oil filters produced and sold for both original equipment and replacement on automotive vehicles operate on the same principle; namely, the filter units are provided with a filtering media or element and under normal operating conditions, oil enters at the top of the filter through a series of holes leading to the outer periphery of the filtering media. The oil then passes through the filtering media during which the oil contaminants are removed and the oil thereafter passes centrally through the filter element and exits through an outlet port, from where the oil is communicated back through the lubrication system of the vehicle engine. Frequently, anti-drainback valves are used which prevent the oil from draining out of the filter after the engine has stopped operating, and in many instances, the filter units are provided with pressure relief valves which provide means for bypassing the filter element or media at such time as a predetermined pressure drop occurs across the filter element, i.e., when the lubricant is in a highly viscous state such as during low temperature operating conditions.

In order for the lubrication systems of the aforementioned type of engines to operate satisfactorily, the lubricant or oil must have certain properties that insure both adequate system flow and minimum performance after delivery. At the same time, the oil must not have any tendency to degrade the life or performance of any component parts of the vehicle engine with which it comes into contact. In light of these requirements, several categorical properties and their acceptable performance levels have been established. Such properties and performance levels include oil viscosity, oil oxidation rate, anti-wear properties, detergent and dispersant properties, and anticorrosion properties. More particularly, engine oil used in modern automotive, as well as light truck, engines are specified by two separate classifications. The first is the engine service classification and relates primarily to the performance of the engine oil under simulated service operating conditions. Typical requirements are a maximum increase in viscosity which would indicate the presence of contaminants in the engine after certain sequential operations, the presence of scuffing and actual wear of certain parts of the oil testing apparatus (typically a specified type of engine), and the presence of other deposits, such as varnish and the like on engine piston rings. The second classification is based on the viscosity of the oil at 0° F. and at 210° F., and engine oils are normally rated at either the 0° F. point, the 210° F. point or at both. For example, a typical specification would be 10W indicating a performance level only at 0° F.; 30 indicating a performance level only at 210° F. or 10W30 indicating minimum performance levels at both 0° F. and 210° F.

Producers of engine oils have found that in order to meet the aforesaid service classifications, petroleum oils by themselves are unsuitable. Consequently, a typical engine lubricating oil contains between 10% and 20% additives or non-oil components, in order to meet these classification requirements. Typical components needed to meet the service classification are detergents, dispersants, inhibitors, anti-wear agents and anticorrosive agents. Those lubricants of the multiple viscosity or multi-grade type require an additive or component in them to provide for acceptable performance at the requisite viscosity levels. Such additives or components are known in the art as viscosity improvers or viscosity index (VI) improvers. Unfortunately, however, many of the additive components of modern engine oils degrade with use, either because of (a) inherent deficiencies, or (b) because their function is, in fact, to be consumed or depleted to provide the necessary or desired feature in the lubricant. More particularly, oil viscosity improvers fall into category (a) since they consist of very large molecules which break up during use so that they can no longer perform their intended function. This breaking up of the VI molecules is referred to as shear-instability, which results from the fact that the molecules are unstable when subjected to high fluid shear rates. In the second category (b) are those types of oil additives which are sacrificed or which are purposely consumed during the service life of the oil. Examples of such sacrificial additives are anti-oxidants which function to prevent the deterioration associated with oxygen attack on the lubricant base fluid. Normally, anti-oxidants are provided in the oil for the purpose of absorbing any oxygen present and thus, among other things, such additives prolong the resistance of the oil to form sludge. Over the service life of the oil, however, the anti-oxidant additives become saturated and hence the resistance of the oil to form sludge gradually terminates. Anti-wear and anti-corrosive additives or compounds are similar to anti-oxidants in that these additives are intended to be deposited on the engine surfaces. Because of the washing action of the oil and the rubbing of the metal surfaces during operation of the engine, however, such deposits do not remain on the critical surfaces and must be replenished at these points from the lubricant. When the concentration of these additives drops below a certain level, the additives can no longer be depositive and hence the engine components are subject to wear and corrosion.

In view of the finite life of the lubricant additives which are utilized in modern engine oils, either because of the inherent deficiencies of such additives or because of their depletion (sacrificial) characteristics, it has heretofore been proposed to replace or replenish such additives and thereby extend the service life of the engine oils. The prior art is replete with a myriad of different ways of effecting such replacement of engine oil additives, and among such prior art teachings are those methods disclosed in the below discussed United States patents which, while being related to the subject matter of the invention disclosed herein, are not believed to be anticipatory of the applicant's inventive concepts as defined in the claims appended hereto.

U.S. Pat. No. 2,302,552, for *Method and Apparatus for Treating Lubricant Oils*, discloses a way of replenishing lubricating oil additives by impregnating an absorbant material, such as the filter material, with a sparingly soluble additive compound such that the passage of lubricating oil through the filter media effects a progressive dissolution of the additives therein. The absorbant material itself is insoluble in the oil.

U.S. Pat. No. 2,310,305, for *Method and Means for Purifying Lubricants,* discloses a system for effecting a continuous replenishment of additive agents in a recirculating engine oil system by providing a separate reservoir or chamber, and preferably utilizing the oil filter itself for incorporating additive agents of low solubility which are contacted by the oil passing through the reservoir or filter to effect a progressive dissolving thereof. It is suggested in this patent that fine particles can be loaded within the filter cartridge or the material of which the filter cartridge is comprised can be coated with the additive substance. Alternatively, or in conjunction with the foregoing, a solid or semi-solid or porous mass of the material or of an inhibitor impregnated inert material may be positioned within the filter chamber so as to be continuously contacted by the oil passing therethrough.

U.S. Pat. No. 2,435,707, for *Method and Apparatus for Treating Oil,* discloses a system for maintaining the effectiveness of the detergent additives present in engine lubricating oils by continuously adding to the lubricant oil an amino soap additive which is very slightly soluble in the oil so as to cause an agglomeration of the detergent suspended colloidal dirt particles in the oil in order that they attain a size in which they can be removed by the filter.

U.S. Pat. No. 2,898,902, for *Apparatus for Supplying Additives to Lubricating Systems,* discloses a mechanical metering system for effecting a periodic replenishment of the additives. The metering system is actuated on a time basis or other cycle, such as, for example, each time the engine is started, whereby a metered quantity of an additive or blend of additives is injected into the crankcase of the vehicle engine.

U.S. Pat. No. 2,943,737, for *Filter and Method of Purifying Oil,* discloses an oil filter in which the filter medium is coated with a thermoplastic resin selected from the group consisting of polyethylene glycol and polypropylene glycol. While the obstensible purpose of the coating is to improve filtering efficiency, apparently some of the polyglycol resin does dissolve and evidently does have a detergent boosting affect.

U.S. Pat. No. 3,314,884, for *fuels and Lubricants Containing Inclusion Compounds.* This patent discloses a technique for supplying active chemical additives to a lubricating oil composition. A release of the additive is achieved by any mechanism which destroys a framework of a surrounding inclusion or housed compound and such techniques include melting, dissolving or other disintegrating of the structure of the housed compound.

U.S. Pat. No. 3,749,247, for *Addition of Oxidation Inhibitor to Lubricating Oil,* discloses a system for replenishing the additives in crankcase motor oils, and in particular, anti-oxidants in the oil, by placing plastic containers composed of polyolefin materials which are filled with liquid additive compounds and are positioned within gaps between the filter element flutes. The additive compound passes through the walls of the container by diffusion at a rate consistent with the need for replacing the anti-oxidant additive in the oil.

All of the various concepts disclosed in the aforementioned patents, while generally addressing themselves to the problems resulting from oil additive depletion, are subject to various objectionable criticisms, due primarily to the complexity of the systems and methods proposed therein and the resultant difficulties of adapting such proposed systems in commerically acceptable filter units. Additionally, such proposed systems are seen to be objectionable from the standpoint that there is no single system or method proposed therein which provides for the replenishment of the three most important oil additives which become depleted throughout the service of the oil, namely, the viscosity index improvers, anti-oxidants, and anti-wear-anti-corrosion compounds. Moreover, such heretofore proposed systems suffer the extremely important shortcoming of not assuring against over or underdosing of the additives, a characteristic which can be as detrimental to the engine oil and engine component parts as the depletion of the original oil additives. For example, if the engine oil is provided with an overdose of a VI improver, there is a marked reduction in the low temperature performance of the oil which in turn results in engine starting difficulties at low operating temperatures.

U.S. Pat. No. 3,336,223, for *Method and Means for Maintaining An Effective Concentration of Additives in Oil,* discloses a system for prolonging the useful life of lubricating oils and is believed to disclose a system which overcomes many of the objectionable characteristics of the various systems described in the aforementioned patents. In particular, the system set forth in the U.S. Pat. No. 3,336,223 patent contemplates providing a oil soluble solid thermoplastic polymer within an oil filter enclosure and impinging the polymer with the circulating oil, whereby oil additives which are compounded into the polymer will be gradually dispersed into the oil. In spite of the many advantages that the system disclosed in the U.S. Pat. No. 3,336,223 patent has over the prior art, this patent falls short at least in one important respect of teaching an additive replenishing system that provides for the optimum rate of additive replenishment during the service life of the oil, and this particular shortcoming has been found to be extremely critical in assuring optimum effective oil life. In particular, it has been found that optimum oil life is achieved in those cases wherein the oil additives are replenished at a relatively uniform or linear rate so as to thereby replenish the original oil additives at essentially the same rate as they become depleted, thus positively assuring against over or underdosing of the additives. In accordance with the present invention, it has been discovered that in order to provide for a linear or constant rate of additive replenishment, it is imperative that the polymer body having the oil additives compounded therein be located at an area within the associated filter enclosure wherein a minimum amount of oil circulation occurs, i.e., a relatively stagnant oil circulating area. By so locating the polymer-additive compound, consistently uniform and linear dispersion or dissolution of the polymer compound will occur, thereby assuring for a linear replenishment of the additives over the desired service life (i.e., between drain intervals) of the engine oil, as will be hereinafter described in detail.

SUMMARY OF THE INVENTION

This invention relates generally to oil filters and, more particularly, to a new and improved filter incorporating an oil soluble thermoplastic polymer having oil additives compounded therein and located within the oil filter at a position so as to assure for a relatively linear rate of dissolution of the polymer.

It is accordingly a general object of the present invention to provide a new and improved oil filter of the above described type.

It is a more particular object of the present invention to provide a new and improved oil filter which assures against over or underdosing of the additives which are being replaced upon dissolution of the polymer.

It is still a more particular object of the present invention to provide a new and improved oil filter unit of the above described type wherein the polymer is disposed with an area of the oil filter housing wherein relatively no turbulent oil flow occurs.

It is a further object of the present invention to provide a new and improved oil filter unit of the above described type which may be provided with baffle means to assure against turbulent oil flowing in direct contact with the thermoplastic polymer in the filter enclosure.

It is yet another object of the present invention to provide a new and improved filter unit, as above described, which uses many parts of conventional filters so as to require a minimum amount of stock filter modification.

It is another object of the present invention to provide a new and improved oil filter unit that will find universality of application in that the principles of properly locating the thermoplastic oil soluble polymer in a relatively stagnant oil flow area may be applied to valveless filter units or those filter units having anti-drainback and/or pressure relief valves.

It is a further object of the present invention to provide a new and improved filter unit of the above described type wherein the oil soluble thermoplastic polymer is preferably, although not necessarily, located upstream of the filter element so as to assure against any polymer migration into the lubrication system of the associated engine.

It is yet another object of the present invention to provide a new and improved filter unit of the above described type which may be economically manufactured and will have a long and effective operational life.

Other objects and advantages of the present invention will become apparent from the following detailed description taken in conjunction with the accompanying drawings.

DESCRIPTION OF THE PREFERRED EMBODIMENTS

Figures 1, 2:
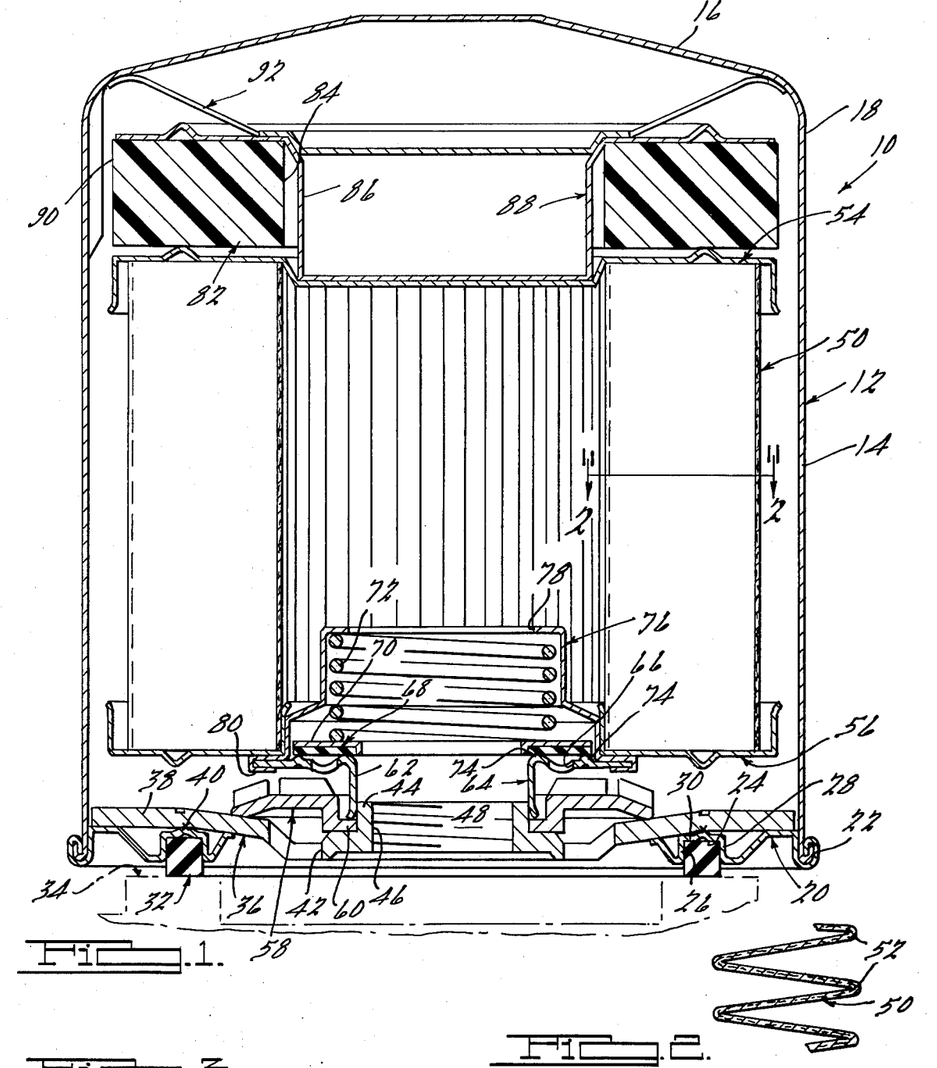
FIG. 1 is a transverse cross sectional view of a vehicle engine filter embodying the principles of the present invention therein.
FIG. 2 is an enlarged fragmentary cross sectional view taken substantially along the line 2—2 of FIG. 1.

Referring now in detail to the drawings and in particular to FIG. 1 thereof, a filter unit in accordance with one preferred embodiment of the present invention is generally designated by the numeral 10 and is shown as comprising an annular housing or enclosure 12 having an annular side wall section 14 and a generally dome-shaped end section 16. The side wall section 14 is formed with a plurality of wrench-engaging faces or facets 18 and the lower open end of the enclosure 12 is provided with an annular closure plate 20 which is secured to the annular side wall 14 by means of a suitable rolled seam or the like 22. The closure plate 20 is formed with an annular recess 24 which is defined by radially spaced wall portions 26, 28 and an axially disposed wall portion 30. Disposed within the annular recess 24 is a fluid seal 32 which is adapted for sealing engagement with a suitable portion of an associated engine block shown in phantom lines in FIG. 1 and designated by the numeral 34.

Secured to the interior side of the closure plate 20 is an annular base plate, generally designated by the numeral 36. The base plate 36 comprises a generally radially extending portion 38 which is secured, as by spot welding or the like, to the closure plate 20, as best seen at 40. The base plate 36 is formed with a plurality of circumferentially spaced, axially extending inlet ports 42 and with a central axially extending flange 44 having an internally threaded inner periphery 46 defining an oil outlet port 48. As will be appreciated by those skilled in the art, the filter unit 10 is secured to the associated engine block 34 by being threadably received upon a suitable stand pipe or the like (not shown) which is threaded into the outlet port 48.

Disposed interiorly of the enclosure 12 is an annular filter element, generally designated by the numeral 50, which may be fabricated of any suitable filter media and is representatively illustrated herein as being fabricated of pleated filter paper which is folded in a manner so as to provide a plurality of pleats or flutes, best seen in FIG. 2 and generally designated by the numeral 52. The filter element 50 is disposed between a pair of axially spaced end caps 54 and 56 which close the axially opposite ends of the flutes 52 so as to assure that oil circulating through the unit 10 will pass radially through the filter element 50.

The filter unit 10 is provided with an anti-drainback valve, generally designated by the numeral 58, which is of a generally disc or ring-shaped configuration and is fabricated of a suitable oil impervious elastomeric material, such as synthetic rubber or the like. The valve 58 is concentrically oriented relative to the oil outlet port 48 and has the inner periphery thereof retained against the interior side of the base plate 36 by means of a generally axially extending section 62 of an annular support flange 64. The flange 64 includes a radially extending portion defining a plurality of circumferentially spaced axially extending oil bypass ports 66.

The filter unit 10 is also shown as being provided with a pressure relief valve, generally designated by the numeral 68, which is fabricated of a suitable elastomeric material and is of a generally ring or disc-shaped configuration, as shown in FIG. 1. The valve 68 is located adjacent one side of a support disc or ring 70 which is adapted to be urged under the influence of a coil spring 72 toward a pair of concentric valve seats 74 defined by the support flange 64, whereby the relief valve 68 will be sealingly engaged with the seats 74 and hence block oil flow through the ports 66. Disposed interiorly from the relief valve 68 is a generally cupshaped spring retainer 76 which is formed with a central opening and is provided with a generally radially arranged securing flange 80 that extends around the outer periphery of the support flange 64.

As is conventional in the art, at such times as the associated engine is operating, oil will be circulated by the engine oil pump through the lubrication passages of the engine and will be communicated through the inlet ports 42 and then radially outwardly around the outer periphery of the filter element 50. The oil will then pass radially inwardly through the filter element 50 and be filtered thereby, after which time the oil will pass axially through the opening 78 and thereafter through the outlet port 48 back to the engine. When the engine is not operating, the anti-drainback valve 58 is disposed in the position shown in FIG. 1, with the outer periphery of the valve 58 being movable axially away from the base plate 38, whereby to permit the aforesaid circulation of oil through the filter element 50, and at such time as the engine is shut off, the valve 58 will again seat against the base plate 36 to prevent any oil within the unit 10 from draining back into the engine. The pressure relief valve 68 is normally seated against the valve seats 74; however, at such times as the filter element 50 becomes clogged or for some other reason that an excessive pressure differential exists between the inlet ports 42 and outlet port 48, the valve 68 will move axially against the resistance of the spring 72, whereupon oil entering through the inlet ports 42 will be circulated through the bypass ports 66 and thereafter be returned through the outlet port 48 to the engine, thus circumventing circulation through the filter element 50.

In accordance with the principles of the present invention, disposed between the dome-shaped section 16 of the enclosure 12 and the end cap 54 of the filter element 50 is a generally ring-shaped or annular additive body, generally designated by the numeral 82. The additive body 82 is formed with a central annular opening 84 adapted to nestingly receive a central portion 86 of a retaining plate, generally designated by the numeral 88, which is disposed between the body 82 and the enclosure section 16. The retaining plate 88 is provided with a generally axially extending annular lip 90 which extends around the outer periphery of the body 82 and a suitable spring element 92 is provided interjacent the retaining plate 88 and the enclosure section 16 for resiliently urging the entire assemblage consisting of the plate 88, body 82, filter element 50 and end caps 54, 56 toward the base plate 36, whereby to assure against any undesirable movement of these components within the enclosure 16.

The additive body 82 may consist of any one of a variety of high molecular weight polymers that are slowly dissolvable in oil and which are suitable to have the desired oil additives compounded therein, whereby when the oil contacts the additive polymer composition, the polymer will have a low rate of dissolution in the oil and will thereby be slowly dissolved and/or dispersed into the oil. If the particular additives which are compounded into the polymer are oil soluble, such additives will dissolve slowly in the oil, that is, at essentially the same rate as the polymer itself. On the other hand, if the additives are oil insoluble when exposed to the oil, they will be carried along with the oil to perform their intended function. The polymer thus serves two essential purposes; it is the carrying medium for the additives and it also protects the additives from immediate contact with the oil. Accordingly, the polymer must be a thermoplastic polymer having a low rate of dissolution in oil and be of a sufficiently high molecular weight so that the polymers and consequently the polymer-additive composition, is solid at the temperature of oil contact, or at least range in viscosity from a plastic-solid to a solid.

Virtually any polymer that has the aforesaid properties may be used in practice in the instant invention such as, for example, ethylene-propylene copolymers ranging in molecular weight from 200,000 to 300,000; ethylene-ethylacrylate polymers ranging in molecular weight from 200,000 to 300,000; polypropylene oxide having a molecular weight of about 500,000; and ethylene-vinyl acetate copolymer ranging in molecular weight from 200,000 to 300,000. One polymer that has been found to be highly satisfactory and which is preferred is polyisobutylene ranging in molecular weight from approximately 60,000 to 135,000, and a preferred polyisobutylene is identified by the registered trademark VISTANEX that is manufactured by the Enjay Chemical Company.

The additives which are compounded into the above discussed polymer can be in liquid or solid form; and as previously mentioned, they can be oil insoluble, or they can range in oil solubility from partially to completely soluble. As used herein, the term "additive" includes all materials which can be compounded or admixed with the polymer and which in any way impart beneficial properties to the oil being circulated through the filter unit 10. It is important to note that the polymer itself will tend to improve the viscosity properties of the oil as the polymer goes into solution and hence the polymer per se falls under the aforementioned definition of additives.

The particular additives to be admixed or compounded with the polymer will, of course, depend on the type and magnitude of additive replenishment which is being sought. For example and as previously described, quality crankcase lubricants contain, for example, detergent additives such as the metal sulfonates, metal phenates, metal phosphenates, derivatives of alkenyl succinimides and the like. Suitable oxidation inhibitors that can be included in the polymer composition are the metal dithiophosphates and metal dithiocarbonates. One particular anti-oxidant additive that has been found to be highly satisfactory and is preferred in the polymer composition is a phenolic anti-oxidant, 4,4'-methylenebis (2,6-di-tert-butylphenol) that is commercially available under the tradename Ethyl 702 manufactured by Ethyl Corporation. Extreme pressure (EP) and oiliness additives, such as sulfur, metal naphthenates, phosphate esters and sulfurized hydrocarbons, etc. may be admixed with the polymer, and one highly satisfactory and preferred EP additive which also is highly satisfactory as a bearing corrosion inhibitor is zinc dibutyldithiocarbomate that is commercially available under the registered trademark BUTYL ZIMATE manufactured by the R. T. Vanderbuilt Company. Of course, additional additives may be admixed or compounded with the polymer and the aforesaid list of such additives is merely intended to be exemplary, and the particular details of acceptable ways of compounding or admixing the additives and polymers is described in the aforementioned U.S. Pat. No. 3,336,223, the contents of which are incorporated by reference in the descriptive portion of this specification. Additional exemplary additives and polymer compositions are also set forth in this patent which may be helpful in compounding the additive body for use in practicing the present invention.

Figure 7:
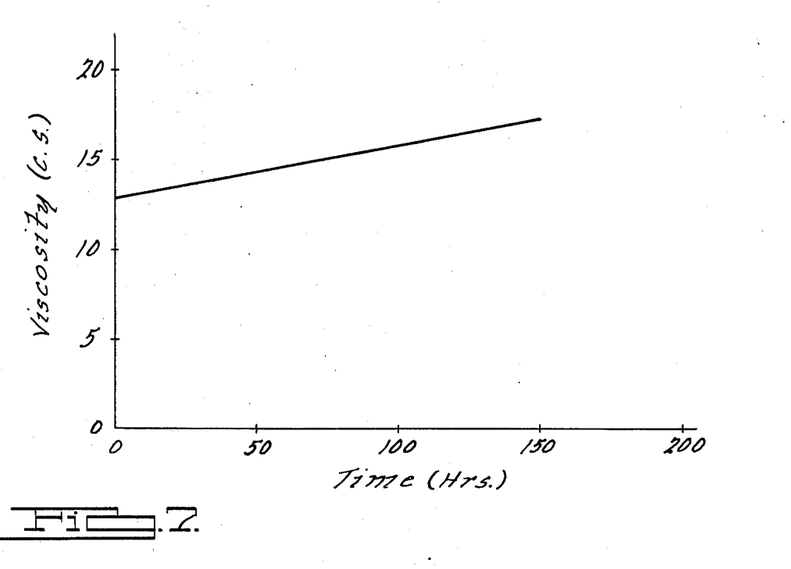
FIG. 7 is a graphic representation of the effect that a thermoplastic polymer utilized in accordance with the teachings of the present invention has an oil circulating in a typical lubrication system.

In accordance with the principles of the present invention, in order to provide for the optimum linear or uniform rate of dissolution of the polymer-additive composition constituting the additive body 82 over the desired life of the oil, i.e., a drain interval of between 3,000 and 7,500 vehicle miles, and thereby assure against over or underdosing of the additives that are replenishing the original depleted additives in the oil, it has been discovered that it is extremely important that the body 82 be located at a position within the enclosure 12 where a minimum amount of oil circulation or flow occurs, i.e., at a location wherein the oil within the enclosure 12 is essentially stagnant, whereby there is virtually the minimum amount of contact of the turbulent oil with the additive body 82. Thus, it is important in complying with the present invention that the oil circulating through the filter unit 10 not in any way impinge directly upon the body 82 since such direct oil impingement would result in turbulent circulating oil contacting the body 82 and hence result in an undesirable and accelerated rate of dissolution of the polymer and consequential premature release of the additives admixed or compounded therein. In the one preferred embodiment of the present invention depicted in FIG. 1 of the drawings, it has been found that the optimum location for the additive body 82 is at the opposite end of the enclosure 12 from the inlet and outlet ports 42, 48, respectively, and at the extreme axial end of the annulus or oil flow area defined between the inner periphery of the side section 14 of the enclosure 12 and the outer periphery of the filter element 50. Extensive research and experimentation has shown that by thus locating the additive body 82 within the enclosure member 12, a substantially linear or uniform rate of dissolution occurs, as is graphically illustrated in FIG. 7. More particularly, FIG. 7 demonstrates the linear rate of dissolution by showing the uniform rate of increase in the viscosity of a test oil that is caused by the dissolution of a VI (viscosity improver) in a test apparatus that does not subject the oil to modes of degradation found in normal engines, but which duplicates the normal drain interval by means of controlling flow rates and temperatures. It will be noted that because of homogenous mixture of the polymer and additives, all additives are replenished at the same linear rate that is demonstrated in FIG. 7. Therefore, when the additive body 82 is so located as to be as far away as physically possible from the areas of turbulent oil flow, the primary object of the present invention of providing a filter unit wherein there is a uniform or linear rate of additive replenishment is achieved. It may be noted that an additional feature of the present invention is accomplished by locating the additive body 82 in the position shown in FIG. 1 of the drawings, namely upstream from the filter element 50, which arrangement assures against any of the polymer body migrating into the lubrication system of the associated engine in the event any portion of the body 82 becomes separated therefrom. In other words, if a part of the body 82 migrates away or is separated from the main body thereof, such migrating portion will be trapped by the filter element 50 and thus be prevented from flowing through the outlet port 48 into the associated lubrication passages or the like of the engine block 34.

FIGS. 3 through 6 illustrate alternate embodiments of the present invention and because the various filter units disclosed therein embody the majority of component parts of the filter unit 10 hereinabove described, such filter units disclosed in FIGS. 3, 4, 5 and 6 will be designated by like numerals with a prime (') suffix, thereby providing for conciseness of description and affording unnecessary duplication of reference numerals.

Figure 3:
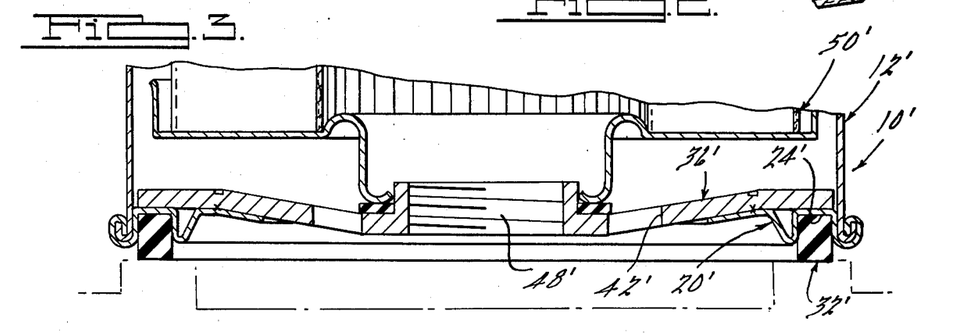
FIG. 3 is an enlarged fragmentary view of a portion of a filter unit similar to the construction shown in FIG. 1 but without the anti-drainback and pressure relief valves incorporated therein.

FIG. 3 illustrates a fragmentary portion of a filter unit 10' which may be identical in construction and operation to the filter unit 10 hereinabove described, with the exception that the unit 10' is not provided with either an anti-drainback or pressure relief valve, and it is to be noted that the principles of the present invention are equally applicable to filter units that are not provided with such valving arrangements, or are provided with only one of such valves. In addition, the filter unit 10' has the filter seal 32' located radially outwardly from the position shown by the analogous seal 32 of the filter unit 10, thereby rendering the filter unit 10' adapted for application on certain types of vehicle engines presently being produced.

Figures 4, 5:
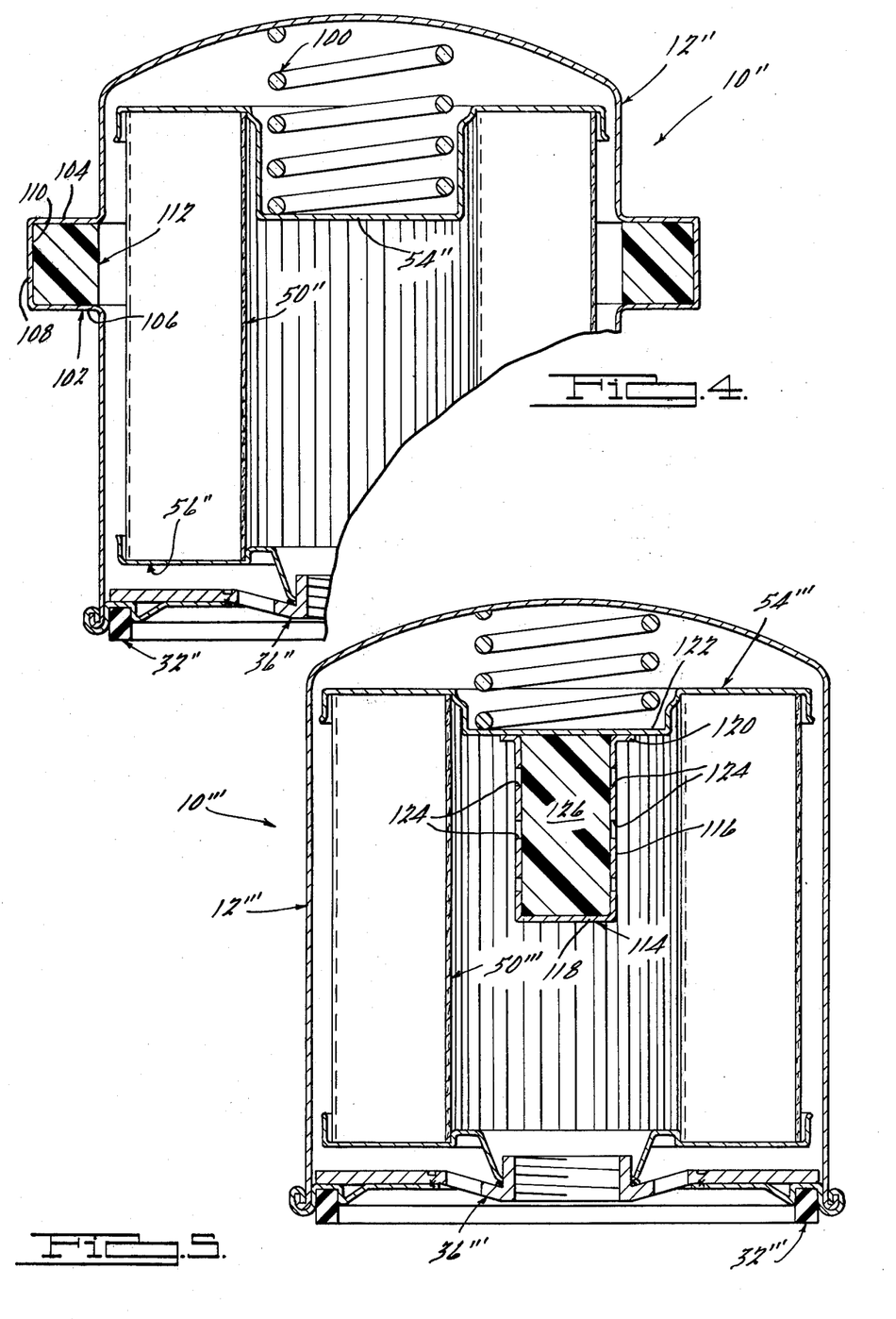
FIG. 4 is an enlarged fragmentary cross sectional view of an alternate embodiment of the filter design of the present invention.
FIG. 5 is an enlarged transverse cross sectional view of yet another embodiment of the filter design of the present invention.

Referring now to FIG. 4, a filter unit 10" is shown as comprising an external housing or casing 12" having a pleated paper filter element 50" disposed interiorly thereof. The casing 12" is provided with a base plate 36" at the mounting end thereof, and a suitable filter seal 32" is located adjacent thereto. The filter element 50' is retained within the enclosure 12" between spaced apart end caps 54" and 56" and a helical coil spring 100 is interposed between the end of the enclosure 12" and the adjacent end cap 54" and serves the same general function as the aforedescribed spring 92 of the filter unit 10. The enclosure 12" of the filter unit 10" is formed with a radially outwardly projecting portion, generally designated by the numeral 102, and comprising axially spaced, radially extending sections 104 and 106 between which a generally axially extending side section 108 is arranged. The sections 104-108 define an annular cavity or chamber 110 within which an annular polymer body 112 is disposed. The body 112 may be compounded of essentially the same material as the aforedescribed body 82 or any acceptable alternative thereof, as hereinabove described. In accordance with the principles of the present invention, the location of the body 112 is such that a minimum amount of turbulent oil flow or circulation will occur adjacent thereto, whereby to provide for the hereinabove described optimum linear or uniform rate of dispersion of the additives therein. If desired, suitable baffle means may be interposed between the interior of the enclosure 12" and the chamber 110 so as to even further limit the amount of contact between the oil within filter unit 10" and the additive body 112. It will be noted that the particular axial position of the chamber 110 along the enclosure 12" may be varied, provided, however, that the position of the chamber 110 is such that the additive body 112 located at an area of low oil circulation consistent with the principles of the present invention and the advantages hereinabove described achieved thereby.

FIG. 5 illustrates still another embodiment of the present invention wherein a filter unit 10'" is shown as comprising a housing or enclosure 12'" having a filter element 50'" disposed therein. The filter unit 10'" is essentially of the same construction and operation as the aforedescribed unit 10", with the exception that the housing 12''' is not provided with a radially outwardly extending section 102 and that the end cap 54''' is provided with a generally centrally located and axially extending additive body support tube, generally designated by the numeral 114. As shown in FIG. 5, the support tube 114 comprises a generally annular side wall 116 which is concentrically arranged relative to the longitudinal axis of the filter unit 10''' and is closed at one end thereof by a suitable end wall 118. The end of the tube 114 opposite the end wall 118 is provided with a radially disposed mounting flange 120 which is adapted to be secured by any suitable manner, such as by spot welding or the like, to the confronting side of a central portion 122 of the adjacent end cap 54'''. The support tube 114 is formed with a plurality of apertures, generally designated by the numeral 124, which provides for limited communication of oil within the filter unit 10''' with a cylindrical additive body 126 disposed interiorly of the tube 114. The body 126 may be of the same composition as the aforedescribed additive bodies 112 or 82 and as such is intended to replenish depleted additives of the oil in the associated circulating lubrication system. The size of the apertures 124 is selected so as to prevent polymer migration and such provide minimum contact of the circulating oil with the additive body 126, whereby to achieve the desired uniform rate of dispersion of the additives therein, as discussed above. As an alternative, the tube 114 could be fabricated of a suitable perforated mesh material of a construction consistent with the above.

Figure 6:
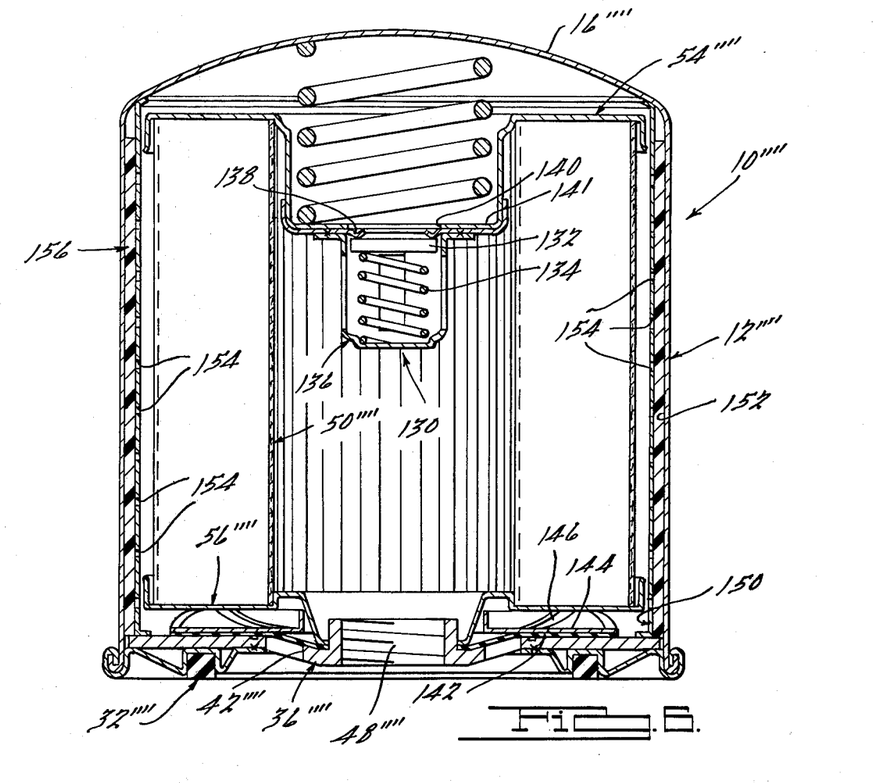
FIG. 6 is a transverse cross sectional view of still a further embodiment of the present invention.

FIG. 6 illustrates still another embodiment of the present invention wherein a filter unit 10'''' is shown as comprising a filter enclosure 12'''' provided with a pleated paper filter element 50'''' which is retained between axially spaced end caps 54'''' and 56''''. Disposed interiorly of the filter element 50'''' is a relief valve assembly, generally designated by the numeral 130 which includes an annular valve member 132 that is resiliently urged by means of a coil spring 134 retained within a spring cage 136, with the valve member 132 normally being engaged with an annular valve seat 138 extending around the periphery of an opening 140 in a central portion 141 of the adjacent end cap 54''''. At such time as the pressure around the outer periphery of the filter element 50'''' exceeds a predetermined magnitude, the valve member 132 will be urged axially away from the valve seat 138 against the resistance of the spring 134, whereby to permit oil to circulate around the filter element 50'''' and through the opening 140 back through the outlet port 48'''' of the base plate 36''''. Together with the relief valve assembly 130, the filter unit 10'''' is provided with an anti-drainback valve 142 which comprises a resilient or elastomeric disc that is resiliently urged into engagement with the adjacent side of the base plate 36'''' by means of a spring plate 144 having a plurality of spring fingers 146 engageable with the confronting side of the end cap 56''''. A more detailed description of the constructon and operation of the relief valve assembly 130 and anti-drainback valve 142 is given in U.S. Pat. No. 3,395,804, issued Aug. 6, 1968, for *Filter Assembly Relief Valves*, the specification of which is incorporated herein by reference.

In accordance with the principles of the present invention, the filter unit 10'''' is provided with an annular baffle plate 150 which extends axially within the enclosure 12'''' between the interior side of the base plate 36'''' and the dome end section 16'''' of the housing 12'''' at a position between the radially outer side of the filter element 50'''' and the inner periphery of the enclosure 12''''. The baffle plate 150 defines with the inner periphery of the side of the enclosure 12'''' an annular chamber or annulus 152 which is communicable with the interior of the enclosure 12'''' by means of a plurality of circumferentially and axially spaced apertures, generally designated by the numeral 154. Disposed within the annulus 152 is an annular shaped additive body 156 which is fabricated of suitable additive compounded polymer as described in connection with the body 82 or bodies 112 and 126. The purpose of the baffle plate 150 is to provide for minimum contact of the turbulent oil circulating through the filter unit 10'''' with the additive body 156, whereby the hereinabove described linear rate of additive replenishment will be achieved. It is contemplated that the size and/or number of apertures 154 in the baffle plate 150 may be varied axially along the length thereof, with a greater number of apertures 154 being provided at the end of the baffle plate 50 adjacent to the filter end cap 54'''', thereby assuring that the maximum oil contact with the additive body 56 occurs at the location of the most stagnant oil or minimum oil circulation within the filter unit 10'''', as hereinabove described.

It will be seen from the foregoing that the present invention provides a novel filter unit wherein through proper placement or location of the additive-polymer compound or body at a position out of any direct impingement of oil circulating through the unit and at a location wherein a minimum amount of contact occurs between the turbulent oil within the unit and the additive body, uniform or linear additive dispersion will occur, thereby assuring against over or underdosing of additives into the oil, and providing for optimum additive replenishment over the service life of the oil in the associated lubrication system. As described above, the aforesaid optimum results may be achieved either through the direct placement of the additive body at a position of minimum contact with the oil circulating through the unit, or a suitable baffle means may be provided interjacent the oil and the additive bodies so as to provide minimum contact of such oil with the polymer. It will be appreciated, of course, that the filter units described hereinabove, while disclosing preferred versions of the present invention, are intended to be only exemplary insofar as acceptable designs in achieving the objects hereinabove set forth. It is to be noted that although the various aforementioned polymer bodies having central openings and passages formed therein have been referred to as being "annular," the present invention is not necessarily intended to be limited to such a construction, since the principles disclosed herein will find highly satisfactory application when the polymer body is solid, i.e., is not formed with any opening or passage. Accordingly, the term "annular," as used in this specification and claims appended hereto is intended to be generic to both those types of polymer bodies that are formed with a central or other type of opening and those bodies of virtually any shape which are solid or are not provided with any type of opening or passage whatsoever. Also, it will be appreciated that various modifications and interchanging of the valve arrangements shown herein can be made without departing from the teachings of the present invention. Accordingly, the scope of the claims appended hereto is in no way intended to be limited to the specific constructions described herein.

I claim:

1. An oil filter for an engine having a circulating oil lubrication system, said filter including an enclosure having a generally cylindrically-shaped side wall and having an annular ring-shaped filter element located concentrically therein, a base plate at one end of said enclosure having a generally centrally located oil outlet opening and at least one oil inlet opening spaced radially from said outlet opening, said filter being of the spin-on type and adapted to have said base plate mounted on a support structure having a mounting element threadably receivable within said outlet opening of said base plate, a first oil passage within said enclosure and located between the inner periphery of the side wall of said enclosure and the adjacent portion of the outer periphery of said filter element communicating said oil inlet opening with the entire axial length of said adjacent portion of the outer periphery of said filter element, a second oil passage within said enclosure communicating the inner periphery of said filter element with said oil outlet opening, an annular body located at a position at the opposite end of said enclosure from said base plate and being substantially axially aligned with said filter element, said body being fabricated of a material having oil improver properties and which is capable of going into solution in the oil when the oil comes in contact therewith, said position of said body being such that oil must flow axially along the entire length of the outer periphery of said filter element before said oil reaches said annular body, with the result that said body is located where relatively limited amount of oil movement occurs, whereby said polymer body will be substantially unaffected by the mechanical movement of oil within said enclosure and will dissolve into the oil at a relatively uniform rate over the normal service life of the oil and thereby assure against over and underdosing of the improver properties being replenished into the oil in said system by dissolution of said polymer.

2. An oil filter as set forth in claim 1 wherein said filter element is fabricated of pleated paper-like material.

3. An oil filter as set forth in claim 1 which includes valve means for controlling oil circulation within said filter.

4. An oil filter as set forth in claim 3 wherein said valve means comprises anti-drainback valve means.

5. An oil filter as set forth in claim 3 wherein said valve means comprises pressure relief valve means.

6. An oil filter as set forth in claim 1 wherein said body is fabricated of a high molecular weight polymer that is slowly dissolvable in oil.

7. An oil filter as set forth in claim 6 wherein said body is fabricated in polyisobutylene.

8. An oil filter as set forth in claim 7 wherein said body has an extreme pressure additive compounded therein.

9. An oil filter as set forth in claim 7 wherein said body has a corrosion inhibitor additive compounded therein.

10. An oil filter as set forth in claim 7 wherein said extreme pressure additive comprises zinc dibutyldithiocarbomate.

11. An oil filter as set forth in claim 7 wherein said body has a phenolic-type anti-oxidant additive compounded therein.

12. An oil filter as set forth in claim 11 wherein said anti-oxidant additive comprises 4,4'-methylenebis (2,6-di-tert-butylphenol).

13. An oil filter as set forth in claim 1 wherein said body is of a generally ring-shaped configuration and comprises radially inner and outer sides, wherein said filter element is fabricated of pleated paper and has the radially inner and outer sides thereof generally axially coincident with the radially inner and outer sides of said body, and wherein said body is fabricated of a thermoplastic polymer. (comprising polyisobutylene having Butyl Zimate and Ethyl-702 compounded therein)

14. A spin-on type oil filter for an engine having a circulating oil lubrication system, said filter including an enclosure having a generally cylindrically-shaped side wall and having an annular ring-shaped filter element concentrically located therein and oil inlet and outlet ports communicable with the lubrication system of the engine, said filter element defining a generally central chamber which is coextensive of the axial length thereof and the periphery of which comprises the outlet side of said filter element, an oil soluble, relatively solid body having oil improver properties, means defining first and second fluid flow paths along which oil flows within said enclosure, said first path being located in part between the inner periphery of said enclosure side wall and the entire axially extending outer periphery of said filter element and communicating said inlet ports with said axially extending outer periphery of said filter element which comprises the inlet side thereof, said second path communicating said outlet port with said chamber and said outlet side of said filter element, said body being fixedly located at a position within said chamber and adapted to be contacted by oil flowing along said second flow path, with said position of said body being such that said element is out of direct impingement of oil entering said enclosure through said inlet so that a minimum disturbance of the concentration gradient between the oil and said body occurs as oil circulates through said filter, whereby said body will dissolve into the oil at a relatively uniform rate over the service life of the oil and whereby any mass portion of said body that becomes separated from the main body thereof will be prevented from migrating into said lubrication system.

15. An oil filter as set forth in claim 14 wherein said body is fabricated of a high molecular weight polymer that is slowly dissolvable in oil.

16. An oil filter as set forth in claim 14 which includes baffle means interposed within the exterior of said body and the oil circulating through said oil filter for controlling the magnitude of contact of said oil with the exterior of said body.

* * * * *

UNITED STATES PATENT AND TRADEMARK OFFICE
CERTIFICATE OF CORRECTION

PATENT NO. : 4,075,097
DATED : February 21, 1978
INVENTOR(S) : George A. Paul

It is certified that error appears in the above-identified patent and that said Letters Patent are hereby corrected as shown below:

Column 7, line 9, "times" should be --time--,
        line 28, "times" should be --time--.

Claim 7, Column 13, line 59, "in" should be --of--.

Claim 13, Column 14, lines 17 and 18, cancel "(comprising polyisobutylene having Butyl Zimate and Ethyl-702 compounded therein)"

Claim 14, Column 14, lines 48 and 49, "distrubance" should be --disturbance--.

Signed and Sealed this

Eighth Day of August 1978

[SEAL]

Attest:

RUTH C. MASON
*Attesting Officer*

DONALD W. BANNER
*Commissioner of Patents and Trademarks*